Dec. 30, 1969       R. L. ALONZO ET AL       3,486,869
      PROCESS FOR THE MANUFACTURE OF FLOAT GLASS UTILIZING
              REGULAR AND AUXILIARY HEATING ELEMENTS
Filed April 25, 1967                          2 Sheets-Sheet 1
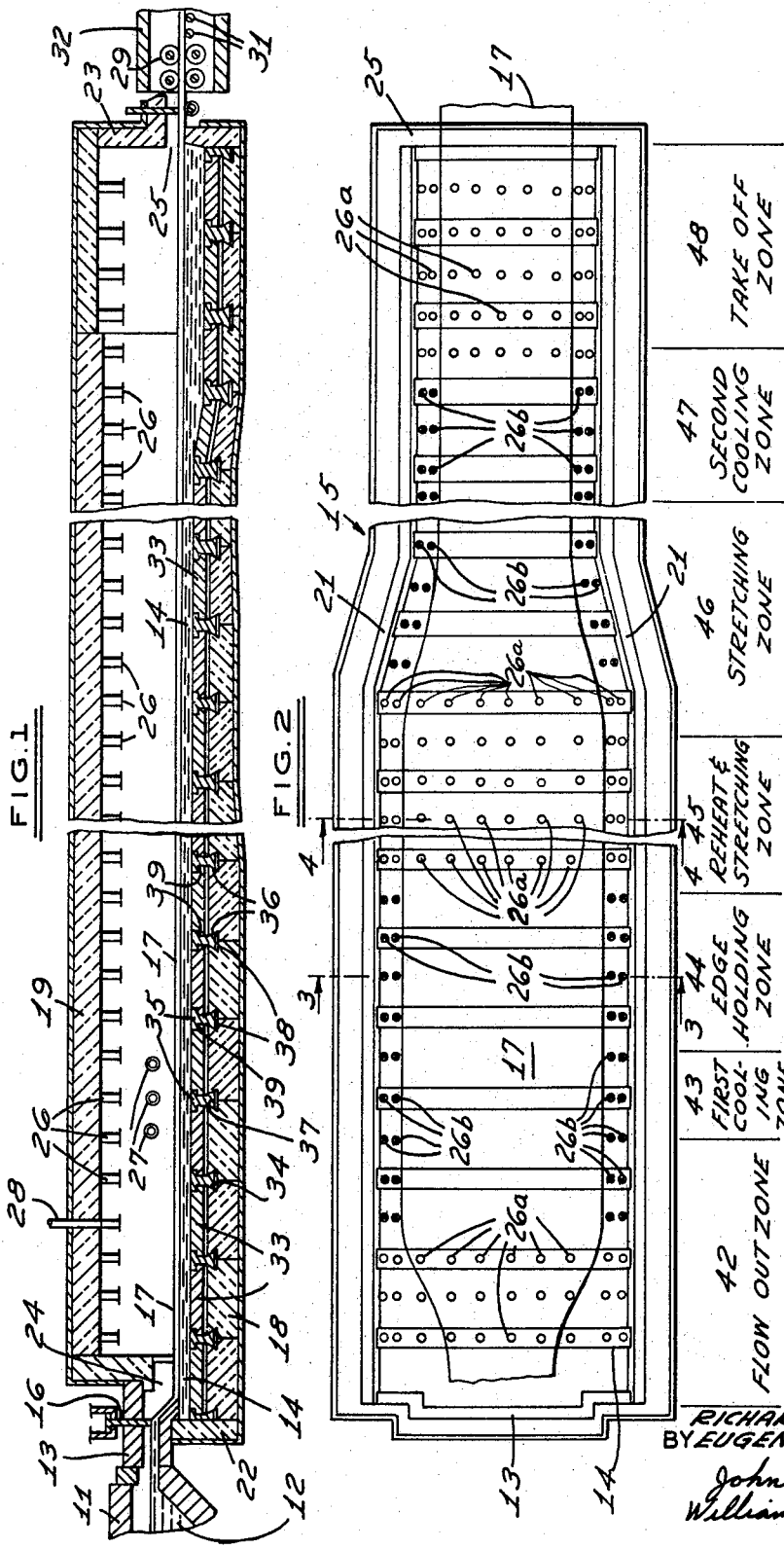
INVENTORS
RICHARD L. ALONZO
BY EUGENE H. AUGUSTIN
John R. Faulkner
William E. Johnson
ATTORNEYS

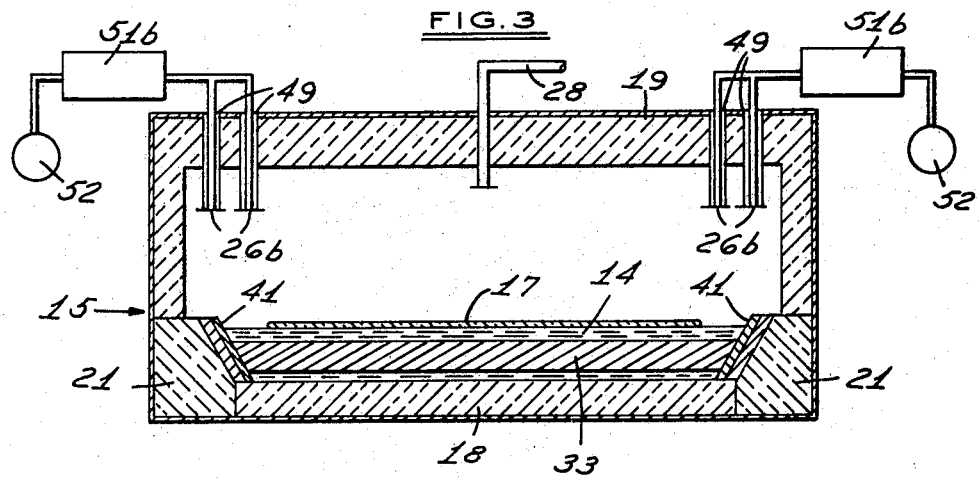
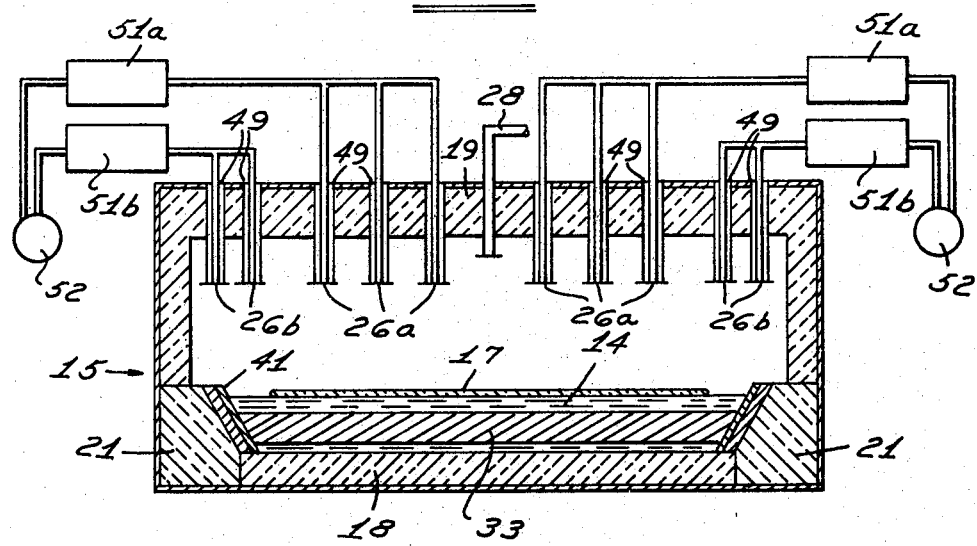

United States Patent Office 3,486,869
Patented Dec. 30, 1969

3,486,869
PROCESS FOR THE MANUFACTURE OF FLOAT GLASS UTILIZING REGULAR AND AUXILIARY HEATING ELEMENTS
Richard L. Alonzo, Nashville, Tenn., and Eugene H. Augustin, Dearborn Heights, Mich., assignors to Ford Motor Company, Dearborn, Mich., a corporation of Delaware
Filed Apr. 25, 1967, Ser. No. 633,492
Int. Cl. C03b 18/02
U.S. Cl. 65—27                                     5 Claims

ABSTRACT OF THE DISCLOSURE

A process for heating up the float chamber utilized in the "float process" of glass manufacture by pressurizing the chamber with a protective atmosphere and thereafter heating the chamber to operational temperature by utilizing heat developed by incandescent heating bodies. The chamber is equipped with selectively operable regular and auxiliary electrical heating elements which provide the heat for the chamber and which permit uniform control of the temperature profile in the chamber. Once the chamber is operating, the auxiliary elements are maintained at a temperature lower than the regular elements so that impurities in the chamber's atmosphere will condense on the auxiliary elements.

BACKGROUND OF THE INVENTION

This invention relates to a proces and chamber utilized for the manufacture of flat glass by the so-called "float process." In the "float process" molten glass is poured on the surface of a bath contained in a chamber to obtain a glass ribbon having true parallelism of its opposite faces and a lustrous, fire-polished surface finish.

Generally, the "float process" involves pouring molten glass on a molten bath so as to form or float a sheet or ribbon of glass on the surface of the bath. The bath is formed from metal or salt having a density greater than that of molten glass. By known means, the molten glass is delivered at a uniform rate to the surface of the molten bath to form a ribbon of glass, the ribbon being advanced along the surface of the bath under thermal conditions which permits the leading portion of the ribbon to continuously harden to a degree sufficient to permit removal of the glass at the end of the bath without harming the surface of the ribbon.

The molten bath, which supports the glass, is contained within a substantially enclosed chamber having upper and lower refractory sections joined together by suitable refractory side and end wall structures. The end wall structures, respectively, have therein entrance and exit passageways through which molten glass is fed to and the glass ribbon removed from the chamber. The lower refractory section forms the container for receiving and supporting the molten bath. Within the chamber, the space above the bath is filled with a protective atmosphere to prevent oxidation of the material making up the bath.

In operation of the "float process" the glass ribbon is progressively cooled as it is advanced along the surface of the bath. This cooling permits the ribbon to harden sufficiently so that it may be continuously removed from the end of the bath chamber by suitable traction rolls without deterioration of the superior surface quality of the glass. Upon its removal from the chamber, the ribbon of glass passes through an annealing lehr and is subjected to further conventional processing.

The desired dimension for the width and thickness of the finished glass is achieved physically by control of the change of viscosity of the advancing glass ribbon and mechanically by the tractive effort applied to the glass ribbon by the traction rolls while the ribbon is being drawn across the molten bath in the chamber.

Physical control of the desired thickness and width dimensions of the glass ribbon, by control of the change of viscosity of the ribbon, is effected thermally by control of the temperature profile within the bath chamber. This thermal control is correlated with the mechanical control of tractive effort applied to glass ribbon in order to produce a finished glass having preselected dimensional sizes.

The thermal control of the viscosity of the glass ribbon is effected preferably by correlated utilization of heating elements and coolers positioned above the glass ribbon in a prearranged pattern in accordance with functionally classified zones of the chamber. For example, heating elements are permanently installed in the area or zone of the roof adjacent the entrance end of the chamber to provide sufficient heat in this zone to insure maximum flow-out of the glass after it is poured onto the surface of the molten bath thereby to allow establishment of a ribbon in the least distance laterally along the length of the bath. The ribbon, after having reached equilibrium by passage through the flow-out zone of the chamber is cooled in a cooling zone and subsequently reheated in a reheat and stretching zone of the chamber to permit the stretching of the glass ribbon to its desired dimensional sizes by application of longitudinal force on the ribbon by the traction rolls. In a take-off or final zone of the chamber, further heat is applied to the ribbon to insure that there is uniform control of the temperatures profile in the chamber and to insure that the ribbon is uniformly heated prior to annealing. The heating elements are preferably regulatable to insure that the proper temperature exists within the chamber thereby insuring control of the viscosity of the ribbon to suit operating conditions and to meet finished product requirements as to quality and size of the flat glass produced.

When a new or rebuilt bath chamber for a "float process" of making flat glass is started up, it is necessary to gradually heat up the chamber from ambient temperature to operational temperatures in order to gradually dry the refractories, allow for gradual expansion of the structure, and to melt the bath material to establish the molten bath in the chamber. In prior start-up practice, it has been standard procedure to utilize temporary, auxiliary heating devices in conjunction with the regular heating elements in order to heat up the chamber. These temporary devices were gas-fired, open flame burners which extended through openings in the sidewall of the chamber so as to project their heat directly into the chamber's interior.

The "float process" has been improved in recent years by lining the portion of the chamber containing the molten bath with slabs of a material which is non-wettable by the glass and a good thermal conductor. Such slabs, usually made from graphite, are positioned in the chamber in a manner and for a purpose more fully described in a co-pending U.S. patent application Ser. No. 409,664, filed Nov. 9, 1964, and now abandoned, and assigned to the same assignee as this application. The utilization of slabs of graphite in the float chamber is also advantageous from the standpoint that these slabs are excellent thermo-conductors. As such, the slabs improve the heat distribution in the bath by making it more uniform. However, the amount of heat which is conducted from the center to the edges of the chamber and thence through the side walls thereof is substantial. The heat loss through the side walls of the chamber is substantial especially during the formation of the glass ribbon. Further, the open-flame gas burners heretofore utilized during start-up of a float chamber have a tendency both to damage the graphite slabs and form soot and other contaminants in the chamber which eventually seriously affects the quality of the glass produced in the chamber. Also, the relatively high dew points associated with the open-flame gas burners when the temperature in the chamber surpasses the oxidation temperature of graphite, permits oxidation of the graphite materials contained in the chamber.

Summary of the invention

To overcome the disadvantages of utilizing open-flame, gas fired burners for heating up a graphite lined float chamber, it has been found that the heat radiated from strategically positioned incandescent bodies in the upper portion of the float chamber will permit full control of the temperature profile of the float chamber during both start-up and normal operation of the chamber. Also, utilization of incandescent bodies as heating elements overcomes such other problems as contamination of both the molten bath and the atmosphere thereby effectively reducing the occurrence of defects in the surface of the flat glass formed in the chamber.

For example, in a preferred embodiment of this invention, incandescent bodies such as electrical heating elements, which can be regulated to establish a desired temperature profile in the chamber, are located in the roof of the chamber in the entrance flow-out zone, the reheat and stretching zone and the exit take-off zone of the chamber to facilitate thermal control of the viscosity of the glass being floated on the molten bath. In accordance with the teachings of this invention, additional incandescent bodies such as auxiliary electrical heating elements are positioned in the roof of the chamber on each side of the chamber. These auxiliary heating elements are utilized in the heat-up of the chamber to heat up the edges of the molten bath and to retain the heat generated in the chamber by off-setting the heat losses through the side walls thereof. Primarily, however, the utilization of auxiliary perature profile in the entire chamber during heat-up thereof thereby assuring uniform expansion of the structural, carbonaceous and refractory components of the chamber, proper drying of the refractories, and a more efficient and cleaner melting of the bat hingots which form the molten bath in the chamber.

The auxiliary heating elements are used only sparingly once the chamber has been heated to operational temperatures and the glass ribbon has been established on the molten bath. When the power to these auxiliary elements is either turned down or off, these elements are cooler than the other components in the chamber and they act as condensers. Impurities such as sulfides and oxides of the material employed in the bath collect on the turned off elements and eventually become heavy enough to fall therefrom. Thus, in accordance with the teachings of the preferred embodiment of the chamber of this invention, the auxiliary heating elements are mounted in the roof of the chamber outside the edges of the glass ribbon established on the molten bath so that the condensate products falling from the turned off elements will fall into the molten bath without affecting the quality of the glass ribbon.

Further, an important advantage of this invention lies in the replacement of the present conventional open-flame gas burners by the auxiliary heating elements. Utilization of the auxiliary elements during heat-up of the chamber allows the chamber to be pressurized by a suitable atmosphere which prevents contamination of both the molten bath and damage to the graphite liners by the by-products of combustion from and the intense heat generated by the gas burners. The protective atmosphere is preferably a slightly reducing, low dew point atmosphere which is non-reactive towards carbon and is fed into the chamber to pressurize the same both before and during heat-up thereby to purge the chamber of any contaminants and minimize oxidation.

Brief description of the drawings

FIGURE 1 is a diagrammatic, longitudinal section of a float glass chamber in accordance with the preferred embodiment of this invention. FIGURE 2 is a diagrammatic, horizontal section through the chamber depicting schematically one arrangement for positioning the heating elements utilized in the chamber of this invention. FIGURE 3 is a vertical section taken along line 3—3 of FIGURE 2. FIGURE 4 is a vertical section taken along line 4—4 of FIGURE 2.

Description of the preferred embodiment

Referring now to the drawings, in FIGURE 1 is seen the delivery end of a conventional glass melting furnace 11 in which a constant level of glass 12 is maintained. The molten glass 12 is delivered through a forehearth 13 onto the surface of a bath 14 of molten metal or salt contained within a chamber 15. A gate 16 controls the rate of glass 12 flowing from the furnace 11. The molten bath 14 has a density greater than that of the glass 12 so that the glass will float on the surface of the bath 14. By delivering molten glass 12 at a constant rate and also withdrawing the continuous sheet thus formed at a constant rate, a continuous glass ribbon 17 of uniform width is produced. In the preferred embodiment described herein, the bath 14 is a pool of molten tin.

The chamber 15 comprises a lower refractory section 18, an upper refractory section 19, defining in part the roof of the chamber 15, side walls 21 and end walls 22 and 23 joined together except for the restricted entrance 24 and exit 25 to provide a substantially enclosed chamber. The side walls 21 and end walls 22 and 23 project above the top surface of the lower refractory 18 to define a container for the pool or bath of molten tin 14.

To maintain the tin in a molten condition and the glass ribbon 17 at the proper temperatures required to form a ribbon of good optical quality, thermal regulation means such as electrical heating elements 26 and coolers 27 are installed in the chamber as will be hereafter described. The coolers 27 are provided to assure that the glass ribbon 17 will be sufficiently cooled and hardened to be removed through the exit 25 without damage to the ribbon. The electrical heating elements 26 are connected to a conventional power source and may be individually controlled and used in conjunction with coolers 27 to obtain the desired rate of cooling of the ribbon 17.

Preferably, the glass 12, is introduced into the tank structure 15 at a temperature of about 1850° F. and then, the glass ribbon 17 is progressively cooled to a temperature of about 1100° F. at the exit 25.

A gas is introduced into the chamber through inlets 28 to provide a protective atmosphere. The gas should be inert or reducing to the components of the bath and should be non-reactive towards carbon. Such gases as nitrogen and/or hydrogen have been used for this purpose.

The cooled glass ribbon 17 is withdrawn by driven traction rolls 29 onto a conveyor 31 to enter an annealing lehr 32 where the ribbon 17 is further cooled under controlled conditions to remove or reduce residual stresses therein.

In order to both permit a reduction of the depth of molten tin and to control the temperature distribution within the molten tin to effect the desirable temperature gradients, a series of rectangular-shaped slabs 33 are positioned in the molten tin bath 14. One procedure for anchoring and holding slabs 33 in place is disclosed in a co-pending application Ser. No. 497,949, filed Oct. 19, 1965, now U.S. Patent 3,393,061 and assigned to the same assignee of this application. It is to be understood that the slabs 33 may be directly fastened to the lower refractory section 18 if that is desired. The slabs 33 are manufactured of a material having a high thermal conductance and preferably both non-wetting with respect to glass and chemically inert to the molten tin. One material that meets these requirements is graphite and in the preferred embodiment of the chamber of this invention, graphite is the material selected to form the slabs 33.

In FIGURE 1, the chamber is shown as incorporating the procedure described in application Ser. No. 497,949, in that each slab 33 is shown as held in position by a transversely extending anchoring or hold-down means such as a key 34. The key, which may also be made of graphite, engages the two opposite transversely extending sides of each slab 33. The longitudinally extending sides of adjacent slabs abut. The joints between adjacent slabs are not sealed and the molten tin bath is permitted to flow under the slabs.

The key 34, which extends across the width of the bath, has an upper T-shaped portion 35 and a lower tenon part 36. The lower refractory 18 has transversely extending keyways 37 in the form of mortises 38 interlockingly receiving the tenon parts 36 of the keys 34 to effect dovetail connections therebetween. The mortise 38 in the lower refractory 18 is slightly greater in depth than the length of the tenon part 36 so as to provide clearance between the key 34 and keyway 37. The transversely extending sides of each slab 33 have stepped portions 39 to engage the side of the T-shaped part 35 of the keys 34.

The slabs 33 of graphite will be raised slightly by the buoyancy exerted upon the slabs 33 by the molten tin until the stepped portions 39 engage the upper T-shaped parts 35 of the keys 34. The upper parts 35 of the keys 34 are retained well below the surface of the molten tin in the bath 14. A depth of the tin bath of one-half to four inches is maintained to reduce the likelihood of the glass ribbon 17 coming into contact with the slab 33 in case the ribbon buckles within the chamber 15.

As best seen in FIGURES 3 and 4, the side wall 21 usually projects above the top surface of the lower refractory 18 with the inward facing surface of the upper portion of the side wall 21 being sloped. A side block 41 of a carbonaceous material, preferably graphite, is held against this sloped surface by conventioned fastening means (not shown) to prevent the glass ribbon 17 from contacting the side wall 21.

The chamber 15 may be divided into several zones to identify the functions performed on the glass ribbon 17 or the certain conditions imposed in the chamber 15 to allow for the formation of a glass ribbon of a specified uniform thickness and of a desired quality. The exact location of the boundaries of these zones will vary with the requirements of the process. In FIGURE 2 there is shown schematically the approximate location of zones that are required for the production of 1/8" thick float glass of windshield quality for instance.

At the beginning of the chamber 15, a flow-out zone 42 is provided. In the flow-out zone 42, the molten glass 12 flowing through the forehearth 13 is delivered to the surface of the bath 14 on which it spreads to form the ribbon 17. Adjacent the flow-out zone 42 is a first cooling zone 43 in which coolers 27 are disposed over the ribbon 17, as best seen in FIGURE 1. The next zone, as seen in FIGURE 2, can be referred to as an edge-holding zone 44 in which edge rolls (not shown) are applied to the ribbon 17. After the rolls are applied, the ribbon 17 is reheated in a reheat and stretching zone 45 to change the viscosity of the glass to permit it to be stretched longitudinally by rolls 29. After reheat, an additional stretching zone 46 is provided to complete stretching the glass ribbon to its final thickness dimension. Then the stretched ribbon 17 is gradually cooled in a second cooling zone 47, and taken off the bath in a take-off zone 48 at the exit 25 of the chamber 15 to be fed into the annealing lehr 32.

As best seen in FIGURES 1, 3 and 4, the electrical heating elements 26 extend through sealed conduits 49 positioned in the upper refractory section 19 into the chamber 15 to approximately 12 to 16 inches above the surface of the molten metal bath 14. The electrical heating elements are, preferably, of a three-legged silicon carbide electrode construction—3 phase—producing approximately up to 5 kw. per element. The elements 26 are supported by support clamps (not shown) attached to the upper refractory section 19.

As best seen in FIGURES 3 and 4, each individual may, or preferably, a group of elements 26 are connected through a control unit 51, which may be in the form of a rheostat, to a power source 52. The control unit 51 permits adjustment for each individual or group of heating elements from 0 to a maximum kw. setting to meet the temperature requirements of the process.

For example, with reference to FIGURE 2, the maximum kw. load for the flow-out zone 42 can be established at 600 kw. obtained from 120 heating elements 26, hereinafter referred to as regular heating elements 26a and identified with a round symbol. The elements 26a are positioned in the flow-out zone to effect temperature readings up to 2000° F. at the entrance of the chamber 15.

In accordance with the principles and teachings of this invention, the first cooling zone 43 and edge-holding zone 44 have electrical heating elements, hereinafter referred to as auxiliary heating elements 26b and identified with a round symbol having an X therein in FIGURE 2. These auxiliary heating elements are preferably located at the sides of the chamber 15 and provide maximum kw. loads of 300 kw. for each zone.

The reheat and stretching zone 45 has regular electrical heating elements 26a across the entire width of the chamber 15. These elements have a capability of providing 3300 kw. for this zone example.

The stretching zone 46 has at the beginning of the zone some regular heating elements 26a extending inward from the sides of the chamber 15. However, the majority of electrical heating elements in the stretching zone are auxiliary elements 26b mounted only adjacent the sides of the chamber 15 with a maximum of 1000 kw. provided for the entire zone 46.

The second cooling zone 47 has only auxiliary electrical heating elements 26b with a maximum total of 300 kw. rating. At the take-off zone 48, regular electrical heating elements 26a are mounted across the entire width of the chamber with a rated load capability of 400 kw.

It is to be understood that not all regular electrical heating elements 26a and auxiliary electrical heating elements 26b in the various zones are in operation all at the same time. For example, some heating elements in specific zones may be selectively energized only during the operation of the float process of manufacturing flat glass or only during heat-up of the chamber 15. The auxiliary heating elements 26b may be regulated by one group of control units 51b and the regular electrical heating elements 26a may be regulated by a second group of control units 51a. As seen in FIGURES 3 and 4, each group of control units 51a and 51b may be even further subdivided to allow for control of each zone, or even portions of any one zone, if desired. The desirability for such control will be more readily understood after reading the following description of the method of operation for heat-up or start-up and, thereafter, operation of the float process.

Operation

To prepare the equipment of the float process for operation, it is preferable, in accordance with the teachings of this invention, to start the flow of atmosphere gas through inlets 28 into the substantially sealed chamber 15 prior to heat-up. The gas, usually nitrogen, is mixed with some reducing gas (usually hydrogen) in a specified manner so as to produce a low combustible gas possessing a low dew point, approximately in the range of −90° F. to −130° F. This dry atmosphere gas absorbs moisture to assist in drying out the refractories of the chamber 15. This high volume of gas fed into the chamber 15 assists in drying out the moisture and purges the chamber of dirt.

The percent of combustible gas is increased when the regular and auxiliary electrical heating elements 26 are turned on. A further advantage of adding atmosphere gas during heat-up of the chamber 15 is its cooling action on the bus bars which connect the heating elements 26 to the control units 51 and the power source 52.

Upon energization of the regular and auxiliary electrical heating elements 26a and 26b, the wattage is gradually increased so that a temperature rise of approximately 150° F. per day is recorded in the chamber to allow for the gradual expansion of the casing, roof structure and refractories defining the chamber 15. After a reading of 1200° F. is recorded in the chamber, the temperature rise of the chamber is increased more readily until approximate the final temperatures in the range of 1850° F. to 2000° F. is reached.

Ingots of tin are added to the reheat and stretching zone 45 after the temperature of the chamber 15 has reached at least 1300° F. The addition of the tin cools the chamber 15 and it has been found desirable to increase the wattage of the regular heating elements 26a in the reheat and stretching zone 45 and the auxiliary heating elements 26b in the edge-holding zone 46 to maintain the temperature in the chamber at a minimum of 1300° F. during the tin melting process.

After the tin is fully melted and the chamber 15 is brought to optimum operating temperature, the glass 12 is allowed to flow onto the surface of the molten bath 14 by raising the gate 16.

After the glass ribbon 17 is formed and continually taken off at the exit 25 of the chamber 15, the auxiliary electrical heating elements 26b may be either turned down or off as the regular electrical heating elements 26a and the molten glass 12 entering the heated chamber 15 maintain the temperature at a sufficient level to allow for the continuous operation of the float process. The auxiliary heating elements 26b, preferably, are only energized after heat-up if the heat loss through the side walls 21 during normal operation of the chamber 15 affects the quality of the ribbon 17.

The auxiliary heating elements 26b, when turned down or off, act as condensers as they are relatively cooler than the upper refractory section 19. For this reason, contaminants, such as tin sulfides, will readily deposit on the auxiliary heating elements. To minimize the drop-off of these contaminants directly onto the glass ribbon 17, the auxiliary heating elements 26b, in accordance with the teachings of this invention, are positioned at the sides of the chamber and outside the edges of the ribbon 17 floating on the molten bath 14. This is best seen in FIGURE 3. Thus, such surface defects as "top speck" are prevented from affecting the quality of glass ribbon 17.

The use of auxiliary electrical heating elements 26b and regular electrical heating elements 26a during heat-up has greatly improved the operation of the float glass process and reduced the time required for starting up the process and minimized downtime heretofore necessary to clean the tin and inner surfaces of the chamber 15. This has been further enhanced by the addition of the inert atmosphere gas usually in part reducing and possessing a low dew point before and during heat-up of the float chamber 15.

Accurate temperature control during any phase of the heat-up and start-up of the process by regulation of the power load to the various regular and auxiliary electrical heating elements 26a and 26b has improved the cleanliness of the molten tin, the expansion of structural components and the drying of the refractories. The continuous purging of the chamber 15 by atmosphere gas during heat-up can be accomplished by this invention as the chamber can be retained at a positive pressure relative to the outside thereof. This is achieved by maintaining the chamber 15 sealed during heat-up which heretofore could not be accomplished due to the fact that open-flame gas burners had to be positioned through openings in the walls of the chamber 15 in order to originally heat up the chamber.

Contamination caused by the gas burners is eliminated. Further, other contaminants that may be formed by the chemical reaction of oxygen and sulfur with the tin due to moisture or impurities in the atmosphere are driven out by the continuous purging of the chamber 15 during heat-up. Those contaminants that still may condense on the auxiliary heating elements 26b will not affect the quality of the glass as they are located outside the glass forming zone.

Thus, there has been disclosed herein both a process of, and chamber for manufacturing flat glass by the "float process." It will be obvious to one skilled in the art that the process and chamber of this invention will have many apparent modifications thereof which will fall within the true spirit and scope of this invention. For example, in the preferred embodiment of the invention, the incandescent heaters were described as electrical heaters. However, such other solid body heaters as radiant heating tubes may be utilized without departing from the spirit of this invention.

What is claimed is:

1. A process for manufacturing flat glass comprising the steps of flowing molten glass onto the surface of a molten metal bath contained in a chamber; heating the chamber initially by supplying electrical energy to regular and auxiliary electrical heating elements mounted in the upper portion of said chamber to heat said chamber to an operational temperature sufficient to permit a continuous ribbon of glass to be established on the molten metal bath; and, once a continuous ribbon of glass has been established on the molten metal bath, regulating the supply of electrical energy to said regular and said auxiliary electrical heating elements in such a manner that said regular elements are hotter than said auxiliary elements whereby contaminants in the atmosphere of the chamber will condense out on said auxiliary elements, and to permit uniform control of the temperature profile in the chamber.

2. The process of manufacturing flat glass as defined in claim 1 including the further step of: initially positioning said auxiliary electrical heating elements in the upper portion of the chamber in such a position that said auxiliary elements are outside the area of the glass ribbon established on the molten metal bath whereby contaminants which condense upon said auxiliary elements when said auxiliary elements are at a temperature below the temperature of said regular elements will fall from said auxiliary elements into the molten metal bath located therebelow rather than onto the glass ribbon.

3. The process of manufacturing flat glass as defined in claim 2 including the further step of: pressurizing the chamber with a relatively low dew point atmosphere substantially non-reactive with carbon during the initial heating of the chamber whereby no foreign material or contaminants enter the chamber during the heating thereof from ambient temperature to an operational temperature.

4. The process of manufacturing flat glass as defined in claim 3 including the further step of: regulating the supply of electrical energy to said regular and auxiliary electrical heating elements so as to increase the temperature within said chamber in accordance with a predetermined program prior to establishing a continuous ribbon of glass on the molten metal bath.

5. A process for manufacturing flat glass comprising the steps of flowing molten glass onto the surface of a molten metal bath contained in a chamber; pressurizing the chamber with a relatively low dew point atmosphere substantially non-reactive with carbon; heating the chamber to an operational temperature sufficient to allow establishment of a glass ribbon on the molten bath by supplying electrical energy to regular and auxiliary electrical heating elements mounted in the upper portion of said chamber; forming a continuous ribbon of glass on the molten metal bath in the chamber; and, once a continuous ribbon of glass has been established on the molten metal bath, regulating the supply of electrical energy to said regular and said auxiliary electrical heating elements such that said regular elements are hotter than said auxiliary elements and impurities in the atmosphere of the chamber will selectively condense on the cooler auxiliary elements and to permit uniform control of the temperature profile in the chamber.

References Cited

UNITED STATES PATENTS

| 3,233,995 | 2/1966 | Javaux | 65—182 |
| 3,332,763 | 7/1967 | Basler et al. | 65—65 |

S. LEON BASHORE, Primary Examiner

E. R. FREEDMAN, Assistant Examiner

U.S. Cl. X.R.

65—65, 99, 162, 168, 182